(12) United States Patent
Beylich et al.

(10) Patent No.: US 10,629,934 B2
(45) Date of Patent: Apr. 21, 2020

(54) RECHARGEABLE BATTERY ASSEMBLY FOR A VEHICLE

(71) Applicant: MANN+HUMMEL GMBH, Ludwigsburg (DE)

(72) Inventors: Markus Beylich, Ludwigsburg (DE); Marcel Mayer, Stuttgart (DE); Andreas Graefenstein, Karlsruhe (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 361 days.

(21) Appl. No.: 15/606,434

(22) Filed: May 26, 2017

(65) Prior Publication Data
US 2017/0263964 A1 Sep. 14, 2017

Related U.S. Application Data

(63) Continuation of application No. PCT/EP2015/078507, filed on Dec. 3, 2015.

(30) Foreign Application Priority Data

Dec. 4, 2014 (DE) ........................ 10 2014 018 231

(51) Int. Cl.
*H01M 8/22* (2006.01)
*H01M 8/0662* (2016.01)
(Continued)

(52) U.S. Cl.
CPC .......... *H01M 8/0687* (2013.01); *B01D 45/12* (2013.01); *B01D 50/002* (2013.01);
(Continued)

(58) Field of Classification Search
CPC ...... H01M 8/0687; H01M 4/382; H01M 4/96; H01M 8/04089; H01M 8/04455;
(Continued)

(56) References Cited

U.S. PATENT DOCUMENTS

2013/0111939 A1   5/2013   Yan

FOREIGN PATENT DOCUMENTS

DE   102009050878 A1   4/2011
DE   102013203197 A1   8/2014
(Continued)

*Primary Examiner* — Jane J Rhee
(74) *Attorney, Agent, or Firm* — James Hasselbeck

(57) ABSTRACT

A rechargeable battery assembly for a vehicle has a metal-air rechargeable battery and a filter device to condition inlet air supplied to the metal-air rechargeable battery such that the inlet air exhibits predetermined inlet air values. The filter device has one or more filter elements, one or more sensor devices that determine at least one inlet air parameter, and one or more valve devices. A control system is coupled to the sensor devices so as to receive sensor signals for the at least one inlet air parameter and is coupled to the valve devices. The control system adjusts, depending on the received sensor signals, the valve devices in order to control the predetermined inlet air value in that the inlet air is guided through the filter elements; is guided past the filter elements; or is guided to an air outlet for regenerating the filter elements.

7 Claims, 5 Drawing Sheets

(51) Int. Cl.

| | |
|---|---|
| *H01M 4/38* | (2006.01) |
| *H01M 12/08* | (2006.01) |
| *H01M 8/04492* | (2016.01) |
| *H01M 8/04746* | (2016.01) |
| *H01M 8/04791* | (2016.01) |
| *H01M 8/04089* | (2016.01) |
| *H01M 8/04828* | (2016.01) |
| *H01M 8/0444* | (2016.01) |
| *B60L 58/27* | (2019.01) |
| *B60L 50/64* | (2019.01) |
| *B01D 45/12* | (2006.01) |
| *B01D 50/00* | (2006.01) |
| *B01D 53/26* | (2006.01) |
| *B01D 53/50* | (2006.01) |
| *B01D 53/52* | (2006.01) |
| *B01D 53/56* | (2006.01) |
| *B01D 53/58* | (2006.01) |
| *B01D 53/62* | (2006.01) |
| *H01M 4/96* | (2006.01) |
| *H01M 8/04082* | (2016.01) |

(52) U.S. Cl.
CPC ......... *B01D 53/261* (2013.01); *B01D 53/508* (2013.01); *B01D 53/526* (2013.01); *B01D 53/565* (2013.01); *B01D 53/58* (2013.01); *B01D 53/62* (2013.01); *B60L 50/64* (2019.02); *B60L 58/27* (2019.02); *H01M 4/382* (2013.01); *H01M 4/96* (2013.01); *H01M 8/04089* (2013.01); *H01M 8/04455* (2013.01); *H01M 8/04507* (2013.01); *H01M 8/04753* (2013.01); *H01M 8/04798* (2013.01); *H01M 8/04835* (2013.01); *H01M 8/0662* (2013.01); *H01M 12/08* (2013.01); *B01D 2251/306* (2013.01); *B01D 2251/404* (2013.01); *B01D 2253/102* (2013.01); *B01D 2257/302* (2013.01); *B01D 2257/304* (2013.01); *B01D 2257/404* (2013.01); *B01D 2257/406* (2013.01); *B01D 2257/502* (2013.01); *B01D 2258/0208* (2013.01); *B60L 2240/36* (2013.01); *H01M 4/386* (2013.01); *H01M 8/04201* (2013.01); *H01M 2220/20* (2013.01); *H01M 2250/20* (2013.01); *Y02E 60/128* (2013.01); *Y02T 10/7005* (2013.01); *Y02T 10/705* (2013.01); *Y02T 90/32* (2013.01)

(58) Field of Classification Search
CPC ......... H01M 8/04507; H01M 8/04753; H01M 8/04798; H01M 8/04835; H01M 8/0662; H01M 12/08; H01M 4/386; H01M 8/04201; H01M 2220/20; H01M 2250/20
See application file for complete search history.

(56) References Cited

FOREIGN PATENT DOCUMENTS

| EP | 0696384 | B1 | | 12/1996 |
|---|---|---|---|---|
| EP | 2533325 | A1 | | 12/2012 |
| KR | 19980019523 | | * | 6/1998 |
| KR | 20140111066 | A | | 9/2014 |

* cited by examiner

RECHARGEABLE BATTERY ASSEMBLY FOR A VEHICLE

CROSS-REFERENCE TO RELATED APPLICATIONS

This application is a continuation application of international application No. PCT/EP2015/078507 having an international filing date of 3 Dec. 2015 and designating the United States, the international application claiming a priority date of 4 Dec. 2014, based on prior filed German patent application No. 10 2014 018 231.2, the entire contents of the aforesaid international application and the aforesaid German patent application being incorporated herein by reference.

BACKGROUND OF THE INVENTION

The present invention relates to a rechargeable battery assembly for a vehicle, wherein the rechargeable battery assembly comprises a metal-air rechargeable battery.

Due to their achievable high-energy density, metal-air rechargeable batteries are suitable in particular for mobile applications, for example, for vehicles. An example of metal-air rechargeable batteries are lithium-air rechargeable batteries. Their function will be explained briefly in the following. When the lithium-air rechargeable battery is discharged, an electron is released at a lithium anode and a positive lithium ion passes through an electrolyte to the carbon cathode. At the carbon cathode, the lithium ion reacts with oxygen in a reduction process first to lithium oxide and then to lithium peroxide. In order for this reduction process to take place, the carbon cathode is coated with a catalyst, is highly porous, and comprises therefore a very large surface area. When charging the lithium-air rechargeable battery, this process is reversed. Oxygen is released at the carbon cathode; metallic lithium is deposited at the lithium anode.

The lithium anode is moisture sensitive because the metallic lithium can react violently with water. Due to its high porosity, the carbon cathode, on the one hand, is susceptible to contamination with particles such as dust or sand and, on the other hand, harmful gases contained in the air can act as catalyst poisons that can irreversibly damage the carbon cathode. Up to now, lithium-air rechargeable batteries and also other metal-air rechargeable batteries have been tested only under laboratory conditions and loaded with high-purity gases in this context.

SUMMARY OF THE INVENTION

It is therefore object of the present invention to provide an improved rechargeable battery assembly.

Accordingly, a rechargeable battery assembly for a vehicle is proposed comprising a metal-air rechargeable battery; a filter device configured to condition the inlet air supplied to the metal-air rechargeable battery in such a way that the inlet air exhibits predetermined inlet air values, in particular a predetermined (relative) air humidity; and a control system. The control system is coupled to several sensor devices for receiving sensor signals for inlet air parameters and is configured to adjust, depending on the sensor signals, valve devices for inlet air flows for controlling the predetermined inlet air values, in particular the (relative) air humidity.

The metal-air rechargeable battery comprises preferably an anode or first electrode which is manufactured of a metal block and a cathode or second electrode which is manufactured of a mesoporous carbon. Depending on which metal is employed as material for the first electrode, the control system is configured to adjust the relative air humidity contained in the inlet air to a value which is required for the metal. When the first electrode is manufactured of lithium, for example, it is required to remove from the inlet air the entire or at least approximately the entire air humidity because of the high reactivity of lithium with water. When using silicon as electrode material, it is required, on the other hand, that the air humidity contained in the inlet air is controlled by means of the control system to a defined and constant value. In this way, damage to the metallic electrode material is prevented for the service life of the metal-air rechargeable battery. Supplying the metal-air rechargeable battery with high-purity gases under laboratory conditions is not needed. The control system can be a control unit. Preferably, the control system is coupled to a vehicle control unit of the vehicle. Inlet air values are to be understood, for example, as the relative air humidity of the inlet air, loading of the inlet air with harmful gases, and/or loading of the inlet air with particles.

The rechargeable battery assembly is in particular suitable for vehicles such as motor vehicles, trucks, motorcycles, aircraft, construction vehicles, rail vehicles, and watercraft. Moreover, the rechargeable battery assembly can also be used for immobile applications as in building technology or the like.

In embodiments, the filter device comprises a pre-separator and/or a particle filter for separating particles from the inlet air. The pre-separator can be a cyclone separator, for example. For particle filtration, the particle filter can comprise a filter medium which is manufactured of paper and/or plastic material. Furthermore, the filter medium can be coated, impregnated, and/or provided with a nanofiber layer.

In further embodiments, downstream of the pre-separator and/or of the particle filter, a first sensor device for detecting inlet air parameters such as loading of the inlet air with harmful gases and/or humidity is provided. The first sensor device is preferably connected by means of a signal line to the control system.

In further embodiments, the filter device comprises a filter element that is configured to remove harmful gases from the inlet air, wherein the filter element is arranged downstream of the first sensor device. In particular, the filter element is configured to chemically filter harmful gases such as sulfur oxides $SO_x$, ammonia $NH_3$, nitrogen oxides $NO_x$, hydrogen sulfide $H_2S$, carbon monoxide CO, carbon dioxide $CO_2$ from the inlet air L. The filter element may comprise, for example, activated carbon for chemical filtration. Moreover, the filter element may comprise potassium carbonate $K_2CO_3$ and/or calcium hydroxide $Ca(OH)_2$ that reacts chemically with acidic harmful gases such as sulfur oxides $SO_x$ or hydrogen sulfide $H_2S$ in order to neutralize these harmful gases. The filter element configured to remove harmful gases from the inlet air can be arranged downstream or upstream of a filter element that is configured to remove humidity from the inlet air.

In further embodiments, downstream of the first sensor device, a first valve device is provided that is configured to guide the inlet air, depending on the inlet air parameters detected by the first sensor device, through or past the filter element that is configured to remove harmful gases from the inlet air. The first valve device is preferably a multi-way valve that is controllable by the control system.

In further embodiments, downstream of the filter element configured to remove harmful gases from the inlet air, a second sensor device is provided for detecting inlet air parameters such as loading of the inlet air with harmful gases and/or humidity. The second sensor device is preferably connected by means of a signal line to the control system.

In further embodiments, the filter device comprises a filter element that is configured to remove humidity from the inlet air, wherein the filter element is arranged downstream of the second sensor device. The filter element can comprise a drying agent, for example, silica beads. The silica beads can be sprinkled onto the filter medium of the filter element and can be glued thereto. Moreover, the filter medium can be designed in a layer structure, wherein, for example, a layer of silica beads can be arranged between two nonwoven layers. In addition or optionally, the filter medium may comprise an absorber material, in particular a so-called superabsorber, a functionalized membrane or the like.

In further embodiments, downstream of the second sensor device, a second valve device is provided that is configured to guide the inlet air, depending on the inlet air parameters detected by the second sensor device, through or past the filter element that is configured to remove humidity from the inlet air. The second valve device is preferably a multi-way valve that is controllable by the control system.

In further embodiments, downstream of the filter element that is configured to remove humidity from the inlet air, a third sensor device for detecting the humidity of the inlet air is provided. The third sensor device is preferably connected by means of a signal line to the control system.

In further embodiments, downstream of the third sensor device, a third valve device is provided that is configured to supply, depending on the humidity of the inlet air detected by the third sensor device, the inlet air to the metal-air rechargeable battery or an air outlet for regenerating the filter element configured to remove humidity from the inlet air. The third valve device is preferably a multi-way valve that is controllable by the control system. The inlet air supplied to the air outlet can be heated by means of a heating device and, for regenerating the filter element, can be passed through the latter.

Further possible implementations of the rechargeable battery assembly comprise also combinations, not explicitly mentioned, of features or configurations of the rechargeable battery assembly described above or in the following with regard to the embodiments. In this context, a person of skill in the art will also add or modify individual aspects as improvements or supplements to the respective basic form of the rechargeable battery assembly.

Further embodiments of the rechargeable battery assembly are subject matter of the dependent claims as well as of the embodiments of the rechargeable battery assembly described in the following. In the following, the rechargeable battery assembly will be explained in more detail with the aid of embodiments with reference to the attached figures.

BRIEF DESCRIPTION OF THE DRAWINGS

In the Figures, same reference characters identify same or functionally the same elements as far as nothing to the contrary is indicated.

DETAILED DESCRIPTION

Figure 1:
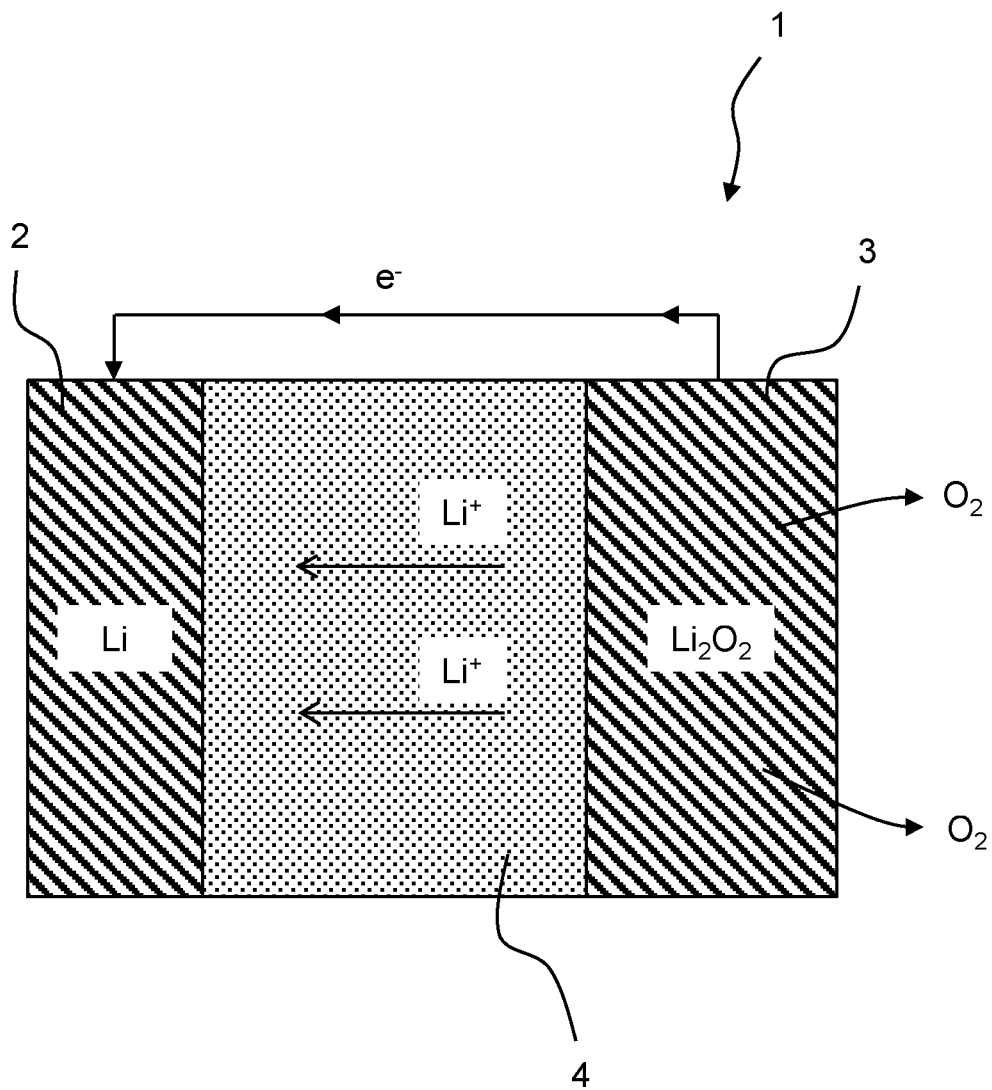
FIG. 1 is a schematic section illustration of an embodiment of a metal-air rechargeable battery in a charging state.
Figure 2:
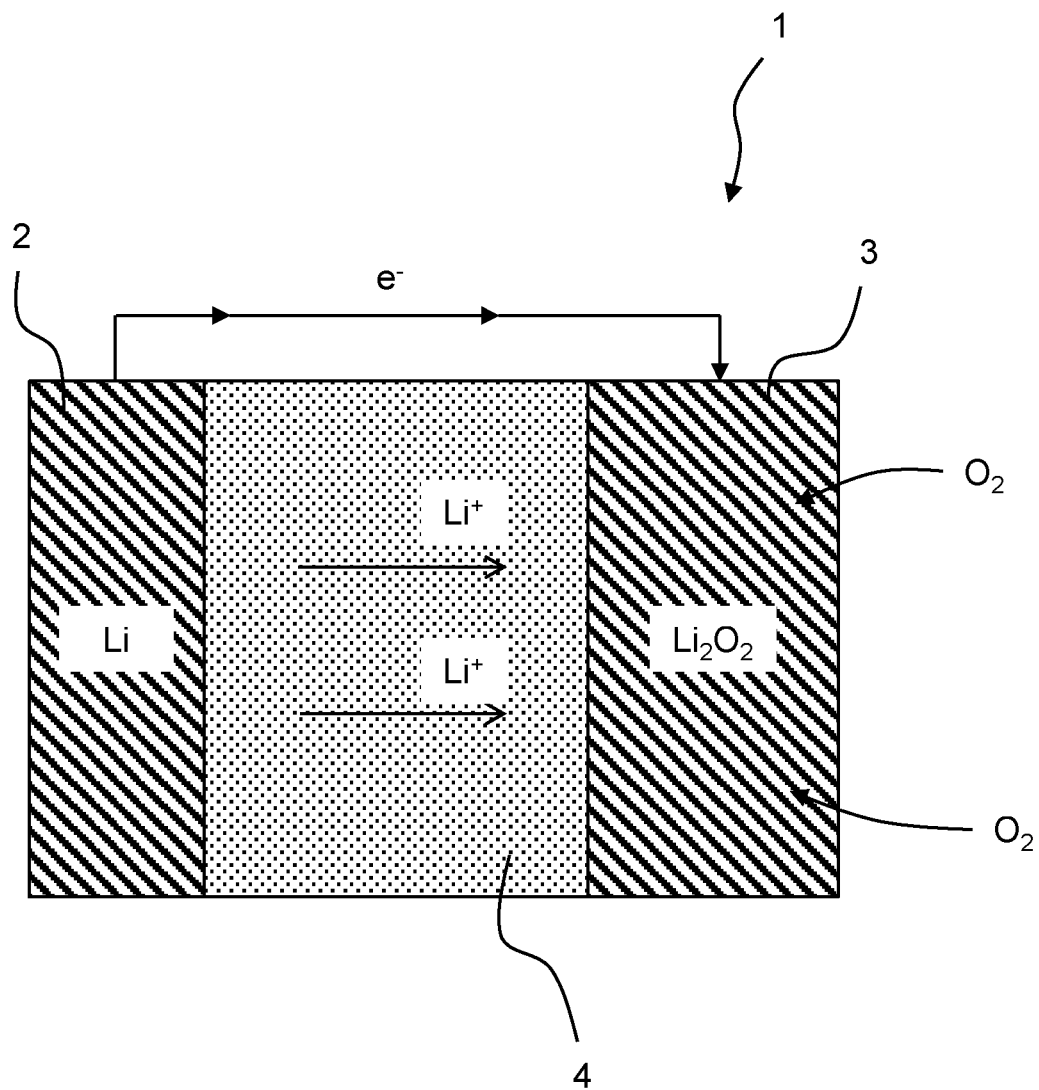
FIG. 2 is a schematic section illustration of the metal-air rechargeable battery according to FIG. 1 in a discharging state.

FIG. 1 shows a schematic section view of a metal-air rechargeable battery 1 in a charging state. FIG. 2 shows a schematic section illustration of the metal-air rechargeable battery 1 in a discharging state. The metal-air rechargeable battery 1 comprises an anode or first electrode 2 manufactured of metal, in particular of lithium Li, and a cathode or second electrode 3. In the following, only lithium-air rechargeable batteries 1 are explicitly described.

The second electrode 3 is constructed of mesoporous carbon C and is not directly participating in the electrochemical process. According to the definition of the International Union of Pure and Applied Chemistry (IUPAC), mesoporous solid bodies are porous materials with a pore diameter between 2 nm and 50 nm. Carbon C serves as an electrical conductor and connector; the mesoporous structure serves for maximizing the surface area in order to facilitate reaction of oxygen $O_2$ with lithium ions $Li^+$ in the area of the second electrode 3.

The first electrode 2 is comprised of a block of metallic lithium Li. Alternatively, the first electrode 2 can be comprised of a different metal, for example, silicon. Between the two electrodes 2, 3, there is an electrolyte 4 which can be liquid or solid depending on the embodiment of the lithium-air rechargeable battery 1. In the case of a solid electrolyte, a solid state rechargeable battery is provided. Moreover, the electrolyte 4 can be an organic liquid that does not react with lithium Li.

Figure 3:
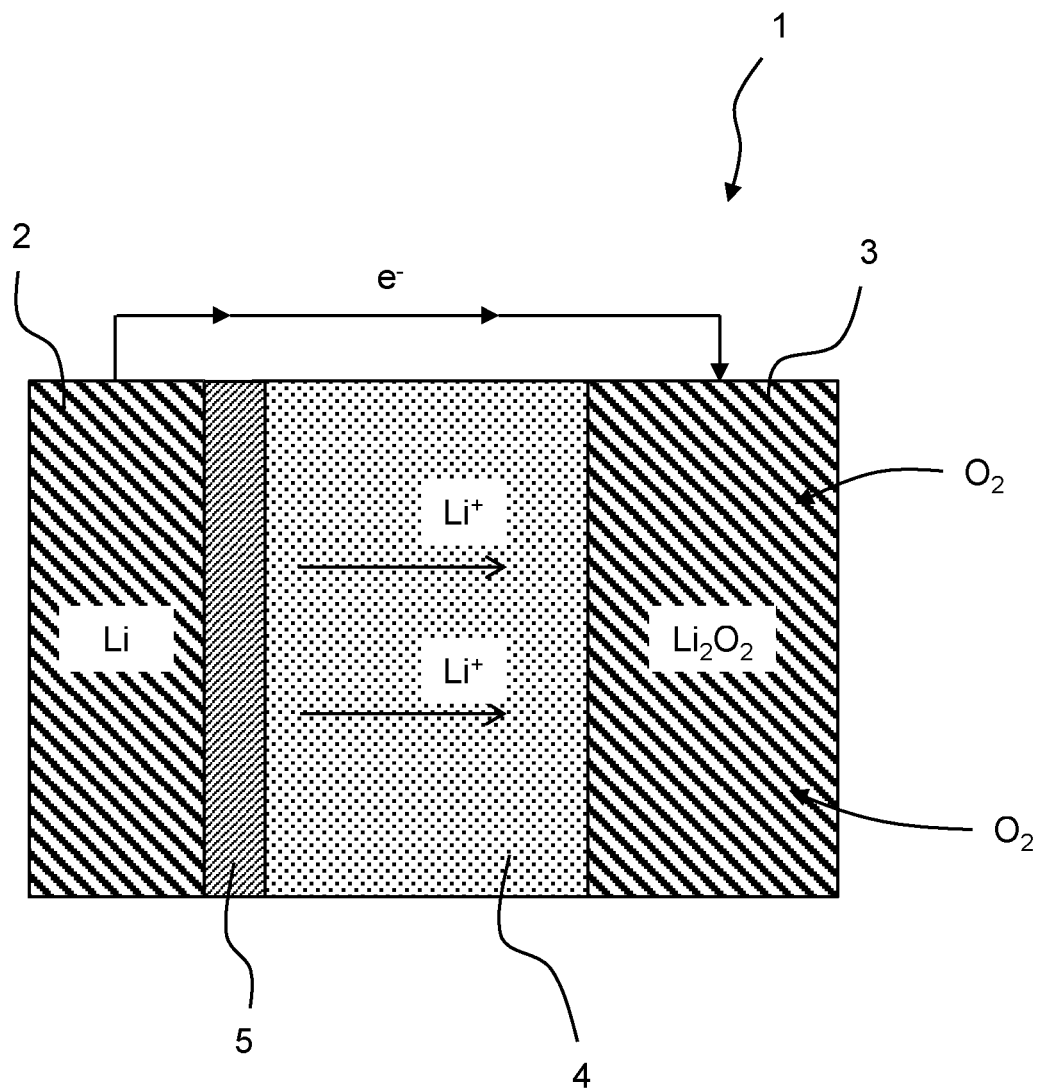
FIG. 3 is a schematic section illustration of a further embodiment of a metal-air rechargeable battery in a discharging state.

FIG. 3 shows a schematic section illustration of an embodiment of a lithium-air rechargeable battery 1 with a water-based electrolyte 4. In order to prevent a reaction of the metallic lithium Li with the electrolyte 4, between the first electrode 2 and the aqueous electrolyte 4 a protective layer 5 is provided. The protective layer 5 can be a glass-ceramic layer applied to the metallic lithium Li. For example, the protective layer 5 is a so-called LISICON layer $(LiM_2(PO_4)_3)$. The protective layer 5 enables that the lithium Li remains stable in the aqueous environment.

Figure 4:
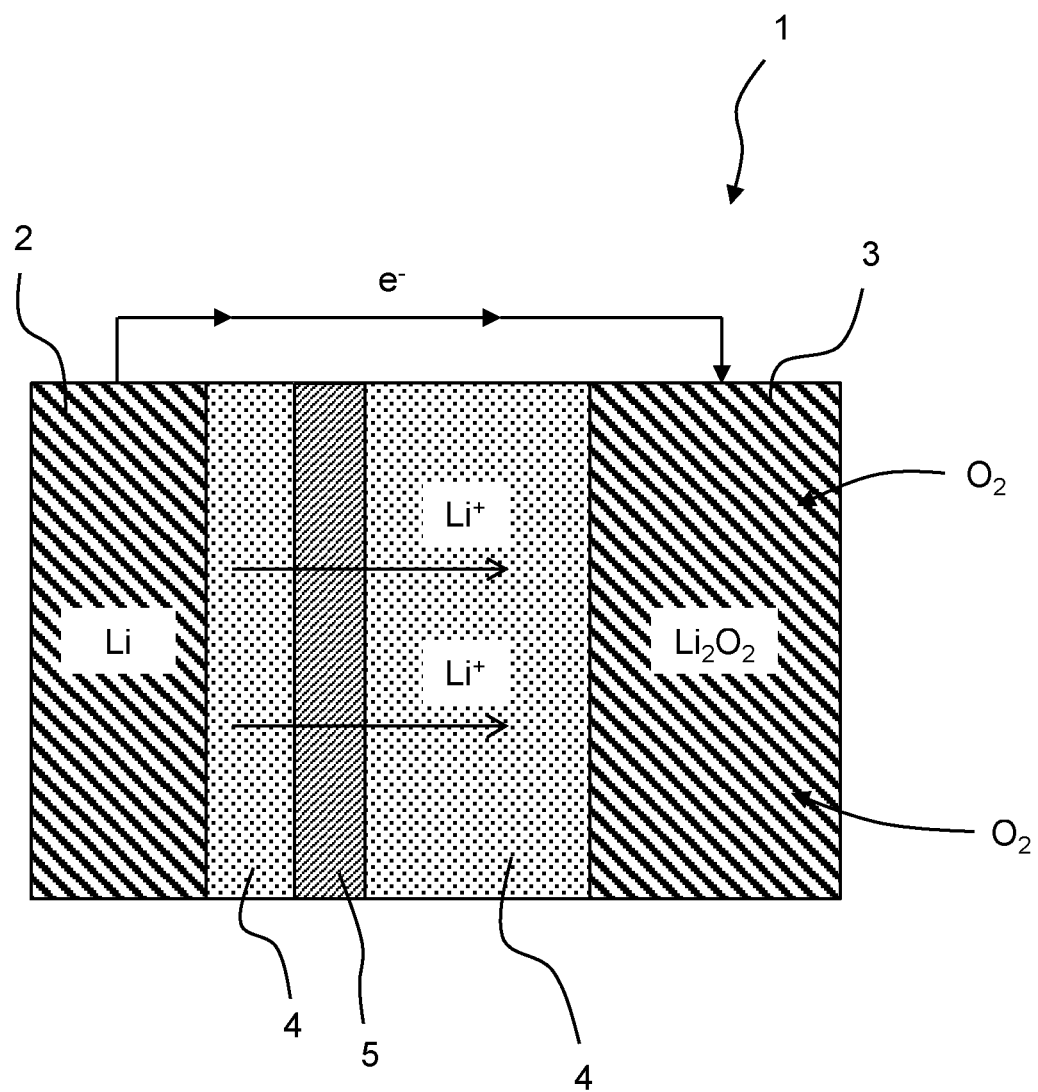
FIG. 4 is a schematic section illustration of a further embodiment of a metal-air rechargeable battery in a discharging state.

FIG. 4 shows a schematic section view of an embodiment of a hybrid lithium-air rechargeable battery 1. Here, between the first electrode 2 and the protective layer 5 an organic electrolyte 4 and between the protective layer 5 and the second electrode 3 an aqueous electrolyte 4 are arranged.

The basic function principle in all types of lithium-air rechargeable batteries 1 is substantially identical. During discharge (FIGS. 2, 3, 4), an electron $e^-$ is released at the first electrode 2 and a positive lithium ion $Li^+$ is transferred through the electrolyte 4 to the second electrode 3 where the lithium ion $Li^+$ reacts with oxygen $O_2$ first to lithium oxide $Li_2O$ and subsequently to lithium peroxide $Li_2O_2$. The following reduction process takes place in this context: $O_2 + 4e^- \rightarrow 2\ O^{2-}$. In order for this reduction process to be able to take place, the second electrode 3 is coated with a catalyst, is highly porous, and comprises therefore a very large surface area. Therefore, the second electrode 3, on the one hand, is susceptible to contamination with particles such as, for example, dust or sand, that can clog or block the second electrode 3; on the other hand, harmful gases such as sulfur oxides $SO_x$, ammonia $NH_3$, nitrogen oxides $NO_x$, hydrogen sulfide $H_2S$, carbon monoxide CO, carbon dioxide $CO_2$ and others act as catalyst poisons that can irreversibly damage the second electrode 3. Moreover, the second electrode 3 is also moisture sensitive.

When charging (FIG. 1) the lithium-air rechargeable battery 1, this process is reversed. Oxygen $O_2$ is released at the second electrode 3; metallic lithium Li is deposited at the first electrode 2. The first electrode 2 is moisture sensitive because the metallic lithium Li can react violently with water.

Figure 5:
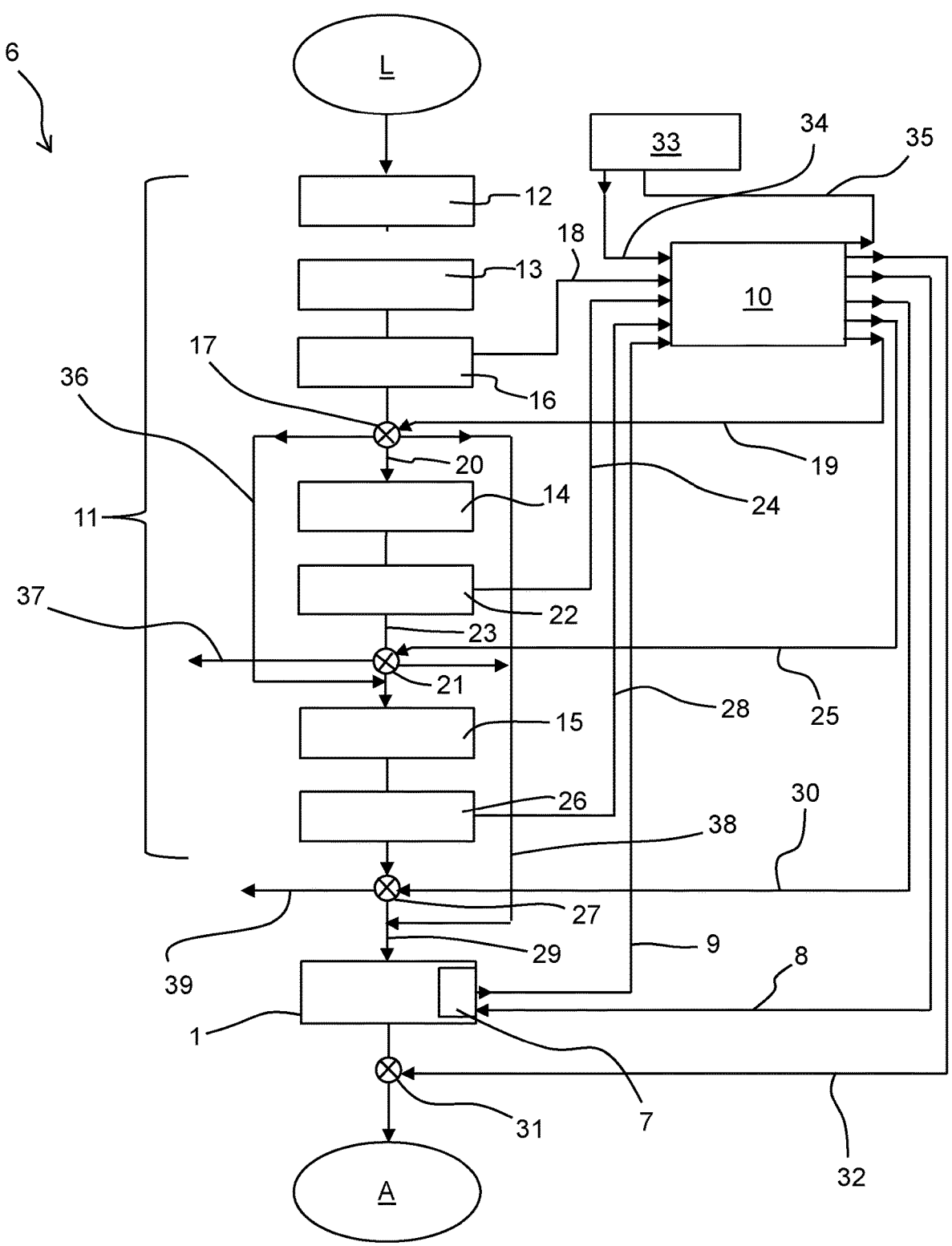
FIG. 5 is a schematic view of an embodiment of a rechargeable battery assembly.

FIG. 5 shows a schematic view of an embodiment of a rechargeable battery assembly 6 with a lithium-air rechargeable battery 1 as described above. The lithium-air rechargeable battery 1 comprises a rechargeable battery control device 7 that is coupled by electrical signal lines 8, 9 to a control system 10 of the rechargeable battery assembly 6. In FIG. 5, electrical signal lines are illustrated by solid lines and air paths by dashed lines. Air paths can be, for example, pipes or channels. The air paths can be integrated in a housing of the rechargeable battery assembly 6.

The rechargeable battery assembly 6 is supplied with inlet air L. The rechargeable battery assembly 6 comprises a filter device 11 which is configured to condition the inlet air L that is supplied to the lithium-air rechargeable battery 1 in such a way that the inlet air L has a predetermined relative air humidity. The filter device 11 comprises a pre-separator 12, for example, a cyclone separator, and a particle filter 13 which is arranged downstream of the pre-separator 12. The particle filter 13 is suitable for particle filtration. This means that the particle filter 13 is configured to mechanically retain particles such as dust, pollen, sand or the like contained in the inlet air L. In this way, clogging or blocking of the mesoporous second electrode 3 is prevented. For particle filtration, the particle filter 13 can comprise a filter medium manufactured of paper and/or plastic material. Moreover, the filter medium can be coated, impregnated, and/or provided with a nanofiber layer.

Downstream of the particle filter 13, a filter element 14 is arranged that is configured to remove harmful gases from the inlet air L. In particular, the filter element 14 is configured to chemically filter harmful gases such as sulfur oxides $SO_x$, ammonia $NH_3$, nitrogen oxides $NO_x$, hydrogen sulfide $H_2S$, carbon monoxide CO, carbon dioxide $CO_2$ from the inlet air L. These harmful gases can act as catalyst poisons that can permanently damage the catalyst provided at the second electrode 3. The filter element 14 can comprise, for example, activated carbon for chemical filtration. Moreover, the filter element 14 can comprise potassium carbonate $K_2CO_3$ and/or calcium hydroxide $Ca(OH)_2$ that chemically reacts with acidic harmful gases such as, for example, sulfur oxides $SO_x$ or hydrogen sulfide $H_2S$ in order to neutralize these harmful gases. In this way, the catalyst action is permanently maintained.

Downstream of the filter element 14, a further filter element 15 is provided that is configured to remove humidity from the inlet air L. The filter element 15 can comprise a drying agent such as, for example, silica beads. The silica beads can be sprinkled onto a filter medium of the filter element 15 and can be glued thereto. Moreover, the filter medium can be of a layer structure, wherein, for example, a layer of silica beads can be arranged between two nonwoven layers. In addition or optionally, the filter medium can comprise an absorber material, in particular a so-called superabsorber, a functionalized membrane or the like.

Between the particle filter 13 and the filter element 14, a sensor device 16 and a valve device 17 are arranged, wherein the valve device 17 is positioned downstream of the sensor device 16. The sensor device 16 is configured to determine the air quality. This means that the sensor device 16 can be configured to determine loading of the inlet air L with harmful gases. Moreover, the sensor device 16 can be configured to determine the humidity of the inlet air L. Loading of the inlet air L with harmful gases and the humidity of the inlet air L are determined as inlet air parameters. The sensor device 16 is coupled by means of the signal line 18 to the control system 10. The valve device 17 is operatively connected by means of a signal line 19 to the control system 10. The valve device 17 is arranged in or on an air path 20 connecting the sensor device 16 and the filter element 14.

Between the filter elements 14 and 15, a further valve device 21 and a further sensor device 22 are positioned. The valve device 21 is arranged downstream of the sensor device 22. In particular, the valve device 21 is provided in or on an air path 23 connecting the sensor device 22 and the filter element 15. The sensor device 22 serves also for determining the air quality. In particular, the sensor device 22 can be configured to determine the air humidity of the inlet air L and loading thereof with harmful gases. The sensor device 22 is connected by means of a signal line 24 to the control system 10. The valve device 21 is connected by means of a signal line 25 to the control system 10.

A further sensor device 26 and a further valve device 27 are positioned between the filter element 15 and the lithium-air rechargeable battery 1, wherein the valve device 27 is arranged downstream of the sensor device 26. The sensor device 26 is operatively connected by a signal line 28 to the control system 10. The valve device 27 that is provided on or in an air path 29 connecting the sensor device 26 and the lithium-air rechargeable battery 1 is connected by means of a signal line 30 to the control system 10. Downstream of the lithium-air rechargeable battery 1, a further valve device 31 is provided which is connected by means of a signal line 32 to the control system 10. A vehicle control unit 33 of a vehicle communicates by signal lines 34, 35 with the control system 10.

In operation of the rechargeable battery assembly 6, the inlet air L flows first through the pre-separator 12 and the particle filter 13, whereby coarse and fine particles are removed from it. The sensor device 16 detects loading of the inlet air L, from which particles have been removed, with harmful gases and/or humidity. When the filtered inlet air L contains no harmful gases or only a quantity of harmful gases that is below a predetermined limit value, the inlet air L is guided by means of the valve device 17 and an air path 36 past the filter element 14 and past the sensor device 22 into the air path 23. When the inlet air L contains harmful gases to be removed, the valve device 17 is switched such that the inlet air L is guided through the filter element 14 in order to remove the harmful gases from the inlet air L.

Downstream of the filter element 14, the air quality of the inlet air L can be determined again by means of the sensor device 22. When loading with harmful gases is too high, the control system 10 recognizes that the filter element 14 must be regenerated. For this purpose, the valve device 21 is switched such that the inlet air L is guided into an air outlet 37. When the control system 10 detects by means of the sensor device 22 that the relative air humidity of the inlet air L already corresponds to a desired value, the valve device 21 is switched such that the inlet air L is guided via an air path 38 past the filter element 15 and past the sensor device 26 into the air path 29. In case of a lithium-air rechargeable battery 1, preferably the entire humidity is removed from the inlet air L. When using other metals, for example, silicon, as the electrode 3, it may also be required to adjust the relative air humidity of the inlet air L to a defined value. Via the air path 38, the inlet air L is guided by the valve device 17 into the air path 29 when neither harmful gas filtration nor conditioning of the humidity of the inlet air L is required. When the humidity of the inlet air L is above a predetermined limit value, the valve device 21 is switched such that the inlet air L flows through the filter element 15 and the sensor device 26.

When the sensor device 26 determines too high a value of the humidity of the inlet air L even though the inlet air L has been passed through the filter element 15, the control system recognizes that the filter element 15 must be regenerated. Then the valve device 27 is switched such that the inlet air L flows to an air outlet 39. Here, the inlet air L can be heated and can be guided again through the filter element 15 in order to regenerate it. The filter element 15 with the humidity-conditioning properties, for example, silica gel, can be regenerated by heat. For this purpose, the filter element 15 is heated or the inlet air L that is flowing through the filter element 15 is heated. The valve device 31 can be switched such that the outlet air A of the lithium-air rechargeable battery 1 can flow into the environment.

What is claimed is:

1. A rechargeable battery assembly for a vehicle, the rechargeable battery assembly comprising:
    a metal-air rechargeable battery;
    a filter device supplying conditioning inlet air to the metal-air rechargeable battery, the filter device comprising:
        a control system configured to receive sensor signals detecting air quality and adjust, depending on the received sensor signals and predetermined air quality values set in the control system, control and adjust valve devices controlling air quality delivered to the rechargeable battery assembly;
        a particle filter connected to an air inlet receiving air from the environment and having a filter medium configured to mechanically retain and remove particles from the air and discharge filter air to a filtered air path;
        a first valve device in communication with and controlled by the control system, the first valve device connect to the particle filter by the filtered air path to receive filter air from the particle filter, the first valve device controlled by the control system to selectively divert the received filtered air to any one of a first air path, a second air path or an air inlet to the metal-air rechargeable battery;
        a first sensor device arranged in the filtered air path between the particle filter and the first valve device and providing sensor readings to the control system, the sensor readings comprising:
            humidity level of the filtered air from the particle filter; and
            concentration of harmful gases in the filtered air from the particle filter, the harmful gases include at least one of sulfur oxides, ammonia, nitrogen oxides, hydrogen sulfide, carbon monoxide and carbon dioxide;
        a second filter device connected to the second air path of the first valve device is configured to neutralize harmful gases in the filtered air to provide chemically filtered air;
        a second valve device in communication with and controlled by the control system, the second valve device connect to the second filter device to receive the chemically filtered air, the second valve device controlled by the control system to selectively divert the chemically filtered air to one of: an air outlet to the environment, a third air path, or the air inlet to the metal-air rechargeable battery;
        a second sensor device arranged between the second filter device and the second valve device and providing sensor readings of the chemically filtered air to the control system, the sensor readings comprising:
            concentration of harmful gases, the harmful gases are at least one of sulfur oxides, ammonia, nitrogen oxides, hydrogen sulfide, carbon monoxide and carbon dioxide; and
            humidity level;
        a third filter device connected to the fourth air path of the second valve device, the third filter device comprising a material configured to remove humidity;
        wherein the first air path of the first valve device connects to the third filter device, bypassing the second filter device and the second sensor device.

2. The rechargeable battery assembly according to claim 1, further comprising:
    a third valve device in communication with and controlled by the control system, the third valve device connect to an outlet of the third filter device to receive the chemically filtered air, the third valve device controlled by the control system to selectively divert the chemically filtered air to one of: the air inlet to the metal-air rechargeable battery, or to a regeneration air outlet to the environment; and
    a third sensor device arranged between the third filter device and the third valve device and providing sensor readings of the chemically filtered air to the control system, the sensor reading comprising a humidity level.

3. The rechargeable battery assembly according to claim 2, wherein
    the second filter device comprises activated carbon.

4. The rechargeable battery assembly according to claim 2, wherein
    the humidity removing material of the third filter device comprises silica beads or silica gel.

5. The rechargeable battery assembly according to claim 2, wherein
    a cyclone preseparator is arranged in the air inlet before the particle filter.

6. The rechargeable battery assembly according to claim 2, further comprising:
    a fourth valve device in communication with and controlled by the control system, the fourth valve device arranged to open and close an air outlet discharging air from the metal-air rechargeable battery to the environment.

7. The rechargeable battery assembly according to claim 2, wherein
    the second filter device comprises potassium carbonate and/or calcium hydroxide configured to react with and neutralize sulfur oxides and hydrogen sulfide in the filtered air to provide chemically filtered air.

* * * * *